United States Patent Office 3,442,194
Patented May 6, 1969

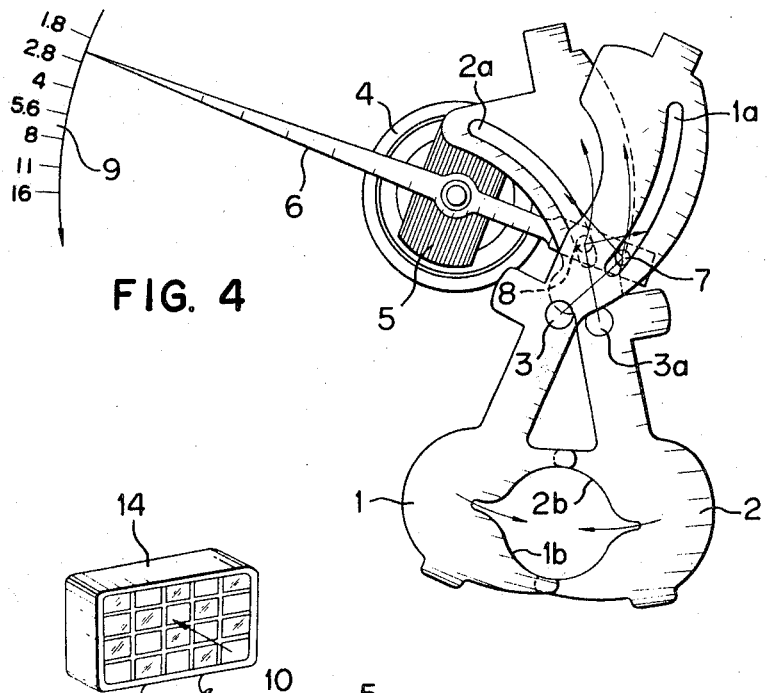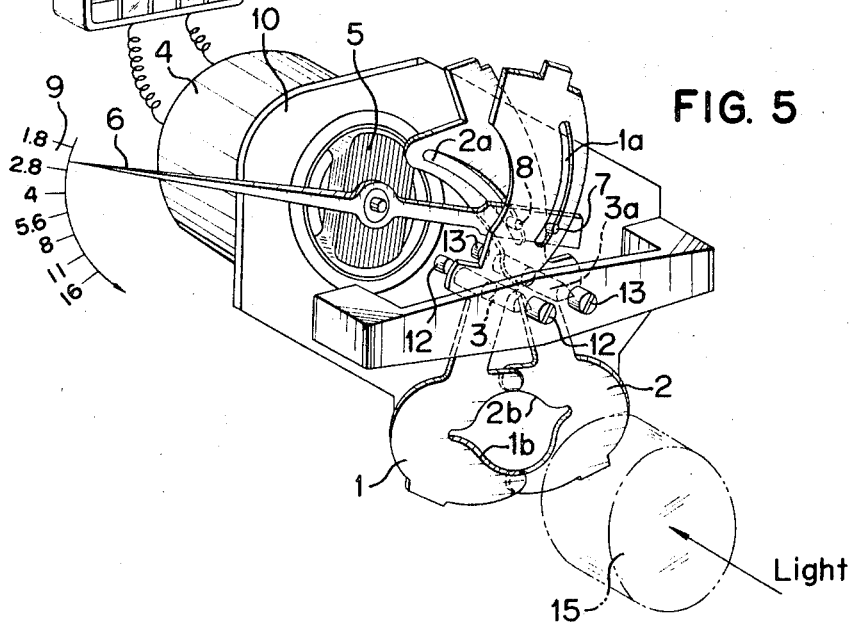

3,442,194
AUTOMATIC ADJUSTMENT MECHANISM FOR APERTURE FORMING BLADES OF A CAMERA
Koji Sho, Yokohama-shi, Japan, assignor to Nippon Kogaku K.K., Tokyo, Japan, a corporation of Japan
Filed Mar. 23, 1966, Ser. No. 536,916
Claims priority, application Japan, Mar. 24, 1965, 40/23,078
Int. Cl. G03b 9/06
U.S. Cl. 95—64                              4 Claims

ABSTRACT OF THE DISCLOSURE

An automatic exposure adjustment mechanism for the diaphragm forming blades of a camera. Maximum angular moment of the diaphragm blades is obtained by locating the pivot points of the blades on a line tangent to the curved cam slot provided in the blades at a point where the pin driven by a light responsive mechanism is in the vicinity of the maximum aperture position of the blades.

---

This invention relates to an automatic exposure adjustment device for the diaphragm forming blades of a camera, and more particularly to an arrangement wherein the pivot points of the blades and the interconnection of the blades with a light responsive device provides a maximum angular moment of force when the blades are in the vicinity of their maximum aperture forming positions.

In the prior art adjustment devices of the character indicated, considerable angular moments of force were required to operate the blades to their various aperture forming positions in response to the photoelectrical currents developed by a photocell or the like. In such devices, the angular moment developed was not always sufficient to drive the blades to their maximum opening positions due to the misdirection of the forces developed by the light responsive mechanism on the aperture blades. Some of the difficulty in the development of insufficient angular moment was the positioning of the pivot points of the aperture-forming blades, and the points at which the force developed by the light responsive mechanism was applied to the blades. Difficulty also arose in providing an accurate adjustment device because of the manufacturing tolerances required and the lack of adjustability after assembly of the device, which resulted in eccentricities in the apertures provided and undersirable friction at the pivot or pivots of the blades.

The principal object of the present invention is to solve the above mentioned defects of the conventional devices.

In accordance with the present invention there is provided an automatic exposure adjustment mechanism for the aperture-forming blades of a camera in which the two independently pivoted blades are provided with curved cam slots in which a follower pin rides, the two pins being angularly and simultaneously moveable by a photomechanism, the pivot points of the two blades being located on lines tangential to the curved slots at points where the respective pins are positioned when the diaphragm blades are in their maximum opened position.

The present invention is explained in detail with respect to the embodiments shown in the accompanied drawing in which:

FIGS. 4 and 5 show an embodiment of the present invention.

Figure 1:
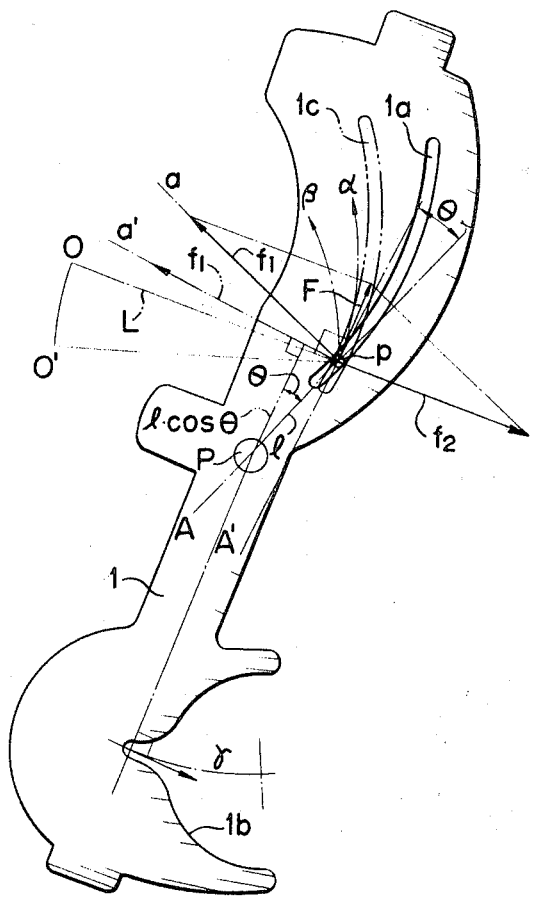
FIG. 1 is a drawing illustrating the principle of the present invention.

Operational principle of this invention will be explained in conjunction with FIG. 1, wherein 1 is a pivotable diaphragm blade provided with a curved cam slot 1a and an aperture section 1b at both sides, respectively, of a pivot P. In cam slot 1a, the portion corresponding to the maximum aperture size of the aperture section is located nearer to the pivot P. A tangential line A drawn to this position passes through the pivot P. As will hereinafter appear, the point O in FIG. 1 is the pivot point of the coil of a galvanometer forming a part of an exposure meter. A pin $p$ is provided which is spaced from the point O by the distance L, the pin $p$ being interlocked with the cam slot 1a and rotatable about the pivot O in the direction of $\alpha$. Assuming the rotational force for the pin $p$ obtained by the photocurrent of the exposure meter as F, this force F may be divided into a component $f_1$ indicated by line $a$, and perpendicular to the tangential line A, and a component $f_2$ indicated by line $a'$ applied against the support pin for the moveable member of the exposure meter. The angular moment, which is represented by $(f_1 \times l)$, rotates diaphragm blade 1 in the direction of $\gamma$.

If cam slot 1a were provided, for example, in a location 1c indicated by the phantom line, the tangential line A' at the point of maximum aperture opening would be shifted by an angle $\theta$ from the line A. To compare the forces applied to the cam slot 1a, the pivot point O of the galvanometer would have to be shifted to the point O' and the pin $p$ moved in an arc in the direction $\beta$. The component $f_1$ (line $a'$) will now develop an angular moment equal to furthermore, the centre O of the moving member shifted to O' and moving $p$ adapted to rotate in the direction of $\beta$ in order to compare under same condition of the lift size of cam means, component $f_1$ in the direction of $a'$ perpendicular to tangential line A would be the same as in the above case and the angular $(f_1 \times l \cos \theta)$, which rotates the blade 1 in the direction of $\gamma$.

As evident from the above, in the case where the pivot P is provided on the prolongation of the tangential line A, the angular moment becomes the maximum value($f_1 \times l$), since $\theta$ is equal to zero. The tangential condition for the cam slot and the pivot to obtain the maximum angular moment will be hereinafter be referred to as the tangential condition.

The rotational angle of the diaphragm blade becomes greater as the diaphragm aperture, or the relative aperture, becomes larger. Such design is expedient where the rotational radius becomes smaller as the diaphragm aperture becomes larger to provide a gradual curvature for the cam slot. Since a smaller radius $l$ results in a smaller angular moment to be transmitted by the meter, it is desirable that the tangential condition referred to above should be satisfied at a location where the larger diaphragm aperture is provided.

Figure 2:
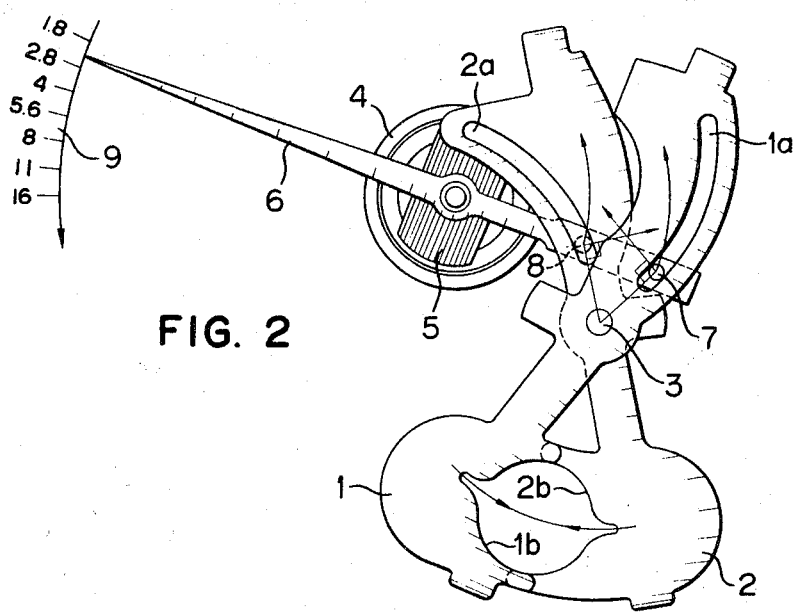
FIGS. 2 and 3 show two forms of a conventional diaphragm adjustment device.

Referring to FIG. 2, 1 and 2 are a pair of diaphragm blades having correspondingly cam slots 1a and 2a and aperture sections 1b and 2b and a common pivot paint 3, which is provided at a cross point of intersecting tangential lines drawn at the respective portions on cam slots corresponding to the maximum aperture size. Both blades are rotatably supported on the pivot 3 and overlap each other. Element 4 is a galvanometer comprising an exposure meter having a moving coil member 5 and a pointer 6 rotatable which the moveable member. Spaced pins 7 and 8 are provided on the end portion of the pointer 6, the pins engaging the cam slots 1a and 2a, respectively, and 9 is an exposure scale plate.

As so far described, the effective angular moment is maximum for the diaphragm blades at the location where the maximum aperture size is provided by the cooperation of the two aperture portions 1b and 2b. Errors in manufacturing the aperture-forming members may be corrected since the pins 7 and 8 are independently engaged in their respective cam slots 1a and 2a. Furthermore, the pivot 3 for the diaphragm blades being common, the axis of the diaphragm aperture which the diaphragm blades produce upon opening or closing of the blades will be free of eccentricities. However, since the pivot 3 is common, manufacturing disadvantages are unavoidable and frictional forces are increased.

Figure 3:
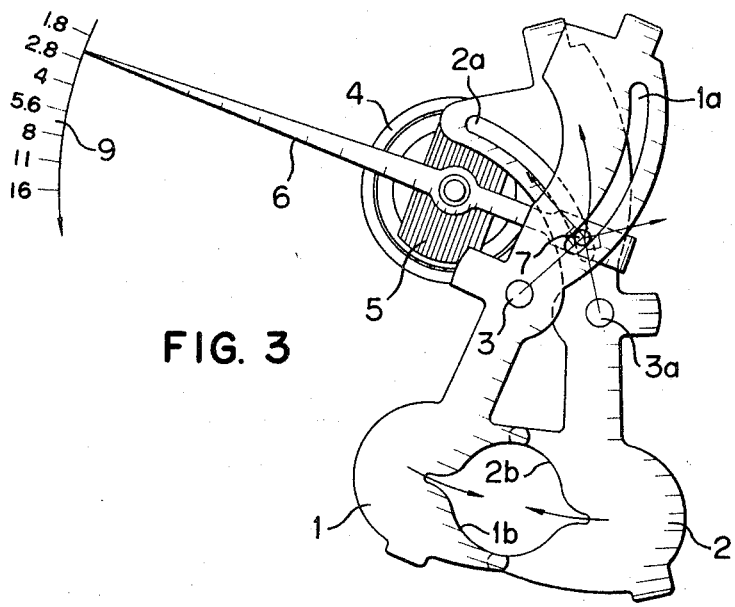

FIG. 3 shows a second adjustment device in which a common pin 7 engages the cam slots 1a and 2a. This device requires two pivot points for the diaphragm blades. However, should the position of the respective pivots 3 and 3a change with respect to each other, eccentricities of the axis of the diaphragm aperture will result when diaphragm blades are pivoted.

FIGS. 4 and 5 illustrate an embodiment of the present invention wherein the problems indicated in connection with the device illustrated in FIGS. 2 and 3 are overcome. In the present invention, the pins 7 and 8 and the pivots 3 and 3a are separately provided, the pins 7 and 8 engage the cam slots 1a and 2a respectively to enable sufficient compensation to be made for any manufacturing errors. The tangential lines drawn at the positions of cam slots 1a and 2a corresponding to the maximum aperture size, intersect each other with the pivots 3 and 3a provided on extensions of the tangential lines. The spacing between the pivots 3 and 3a is sufficiently close so that any eccentricity of the axis of the aperture formed is negligibly small; the maximum angular moment being at the maximum aperture size.

The operation of the embodiment of the invention will now be described in connection with FIG. 5. In FIG. 5, 1 and 2 constitute a pair of diaphragm blades, 3 and 3a are pivots, 4 is a galvanometer, 5 is a movable coil, 6 is pointer, 7 and 8 are pins adjustably mounted on the front and back surface, respectively, of pointer 6, 9 is an exposure scale plate. A front plate 10 forming a part of a camera body (not shown) is provided with a supporting plate 11 which the front plate supports journals 12 and 13 for the pivots 3 and 3a. A photoresponsive cell 14 is provided, the light rays passing through an objective lens 15 to impinge upon the cell 14. The weak photoelectrical current developed by the photocell is applied to and rotates the coil 5 of the galvanometer by predetermined amount dependent upon the light value. The pins 7 and 8 are rotated by the moving coil 5 to pivot the diaphragmed blades 1 and 2 around pivots 3 and 3a to determine the effective aperture size for the objective 15.

In accordance with the invention, the effective maximum angular moment for the diaphragm blades is at a maximum when the diaphragm aperture formed between the aperture portions of the blades is approximately maximum. In the embodiment of the invention illustrated in FIG. 4, the otherwise possible eccentricity of the diaphragm aperture formed by the aperture sections of the diaphragm blades is avoided in operation. The provision of the individual pivots and the individual pins readily permits adjustments to be made. In addition, the adjustability of the pivot and pins allows freedom in designing to permit adaptation of the invention to various types of cameras and camera bodies.

What is claimed is:

1. An automatic exposure adjustment mechanism for a camera having a built-in exposure meter including a rotatable coil, the combination comprising a pair of pivotable aperture-forming blades for the camera objective, each of said blades being formed with an arcuate cam slot, a pair of spaced pivots in the camera pivotally supporting the aperture-forming blades, a lever arm rotatable with the exposure meter coil, and a spaced pair of pins secured to lever arm, a pin registering in the cam slot of each blade, tangential lines at the pin positions in the slots corresponding to the maximum aperture positions of the blades intersecting each other, the pivots of the blades being on the tangential lines to their respective cam slots.

2. Adjustment mechanism according to claim 1, wherein the lever arm is secured to the movable coil and extends radially therefrom, the two spaced pins being secured at the radial outer end of the lever arm.

3. Adjustment mechanism according to claim 1, wherein the cross point of lines interconnecting the pins and pivots of their respective aperture-forming plates is intermediate the pins and the pivots.

4. Adjustment mechanism according to claim 2, wherein the cross point of lines interconnecting the pins and pivots of their respective aperture-forming plates is intermediate the pins and the pivots.

References Cited

UNITED STATES PATENTS

| | | | |
|---|---|---|---|
| 3,122,980 | 3/1964 | Hautmann | 95—64 |
| 3,351,413 | 11/1967 | Kono | 352—78 |

FOREIGN PATENTS

| | | |
|---|---|---|
| 911,861 | 11/1962 | Great Britain. |
| 1,027,598 | 4/1966 | Great Britain. |

NORTON ANSHER, *Primary Examiner.*

ROBERT A. SCHROEDER, *Assistant Examiner.*

U.S. Cl. X.R.

95—10